United States Patent
Fujita et al.

(10) Patent No.: US 9,910,279 B2
(45) Date of Patent: Mar. 6, 2018

(54) PROJECTION DISPLAY DEVICE AND TEMPERATURE CONTROL METHOD THEREOF

(71) Applicant: FUJIFILM Corporation, Tokyo (JP)

(72) Inventors: Koudai Fujita, Saitama (JP); Daisuke Ito, Saitama (JP); Kenji Ito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/614,622

(22) Filed: Jun. 6, 2017

(65) Prior Publication Data

US 2017/0269365 A1    Sep. 21, 2017

Related U.S. Application Data

(63) Continuation of application No. PCT/JP2015/081697, filed on Nov. 11, 2015.

(30) Foreign Application Priority Data

Dec. 22, 2014   (JP) ................................. 2014-258978

(51) Int. Cl.
| | | |
|---|---|---|
| G03B 21/16 | (2006.01) | |
| H04N 9/31 | (2006.01) | |
| G02B 27/01 | (2006.01) | |
| H04N 5/74 | (2006.01) | |
| B60K 37/06 | (2006.01) | |

(52) U.S. Cl.
CPC .......... *G02B 27/0101* (2013.01); *B60K 37/06* (2013.01); *G03B 21/16* (2013.01); *H04N 5/74* (2013.01); *G02B 2027/014* (2013.01); *G02B 2027/0141* (2013.01); *H04N 9/3144* (2013.01)

(58) Field of Classification Search
CPC ...... G03B 21/16; G03B 21/14; G03B 21/145; H04N 9/3144; H04N 9/3141; G02B 27/01
USPC ..................... 353/119, 57, 58, 60, 61, 13, 14
See application file for complete search history.

(56) References Cited

U.S. PATENT DOCUMENTS 6,443,575 B1    9/2002   Miyamoto et al.

FOREIGN PATENT DOCUMENTS

| JP | H10-133177 | 5/1998 |
|---|---|---|
| JP | H11-119181 | 4/1999 |
| JP | 2001-133885 | 5/2001 |

(Continued)

OTHER PUBLICATIONS

"International Search Report (Form PCT/ISA/210) of PCT/JP2015/081697", dated Feb. 16, 2016 with English translation thereof, pp. 1-4.

(Continued)

*Primary Examiner* — Ryan Howard
(74) *Attorney, Agent, or Firm* — JCIPRNET (57) ABSTRACT

A HUD includes a light source unit 57, a light modulation element 54 that modulates light that is emitted from the light source unit 57, a projection portion that projects the modulated light onto a projection surface, wind guide paths 61 and 62 that guide wind W sent from an air conditioning device 9 of a car 100 to the light source unit 57, the wind guide path 61 that guides the wind W to the light modulation element 54, a shutter 63 for performing blocking and opening of the wind guide paths 61 and 62, and a system control unit 64 that selectively performs control for blocking the wind guide paths 61 and 62 and control for opening the wind guide paths 61 and 62 by controlling the shutter 63.

8 Claims, 6 Drawing Sheets

(56) References Cited

FOREIGN PATENT DOCUMENTS

| | | |
|---|---|---|
| JP | 2003-118426 | 4/2003 |
| JP | 2004-189112 | 7/2004 |
| JP | 2005-062666 | 3/2005 |
| JP | 2010-054766 | 3/2010 |
| JP | 2014-153578 | 8/2014 |

OTHER PUBLICATIONS

"Written Opinion of the International Searching Authority (Form PCT/ISA/237) of of PCT/JP2015/081697", dated Feb. 16, 2016, with English translation thereof, pp. 1-6.

PROJECTION DISPLAY DEVICE AND TEMPERATURE CONTROL METHOD THEREOF

CROSS-REFERENCE TO RELATED APPLICATIONS

This application is a Continuation of PCT International Application No. PCT/JP2015/081697 filed on Nov. 11, 2015, which claims priority under 35 U.S.C § 119(a) to Japanese Patent Application No. 2014-258978 filed on Dec. 22, 2014. Each of the above application(s) is hereby expressly incorporated by reference, in its entirety, into the present application.

BACKGROUND OF THE INVENTION

1. Field of the Invention

The present invention relates to a projection display device and a temperature control method thereof.

2. Description of the Related Art

A head-up display (HUD) device for a car in which a windshield of a car or a combiner arranged near the front of the windshield is used as a screen, and projection light is projected onto the screen so that an image is displayed is known (see, for example, JP2014-153578A, JP1998-133177A (JP-H10-133177A), and JP2004-189112A). According to this HUD, a user can view an image that is displayed on a windshield or the like by the projection light projected from the HUD, which is superimposed on a scenery ahead of the own vehicle that is on the back side of the windshield or the like.

The HUD described in JP2014-153578A is configured to dissipate heat from a digital micromirror device (DMD) serving as a light modulation element to the outside by exposing the DMD to outside pores in which outside air are taken. According to this configuration, since the DMD can be cooled without using a fan or the like that cools the DMD, operation sound of the HUD can be reduced.

In the HUD described in JP1998-133177A (JP-H10-133177A), a stable operation can be realized by warming a backlight of a liquid crystal display device serving as a light modulation element under a low temperature environment.

The HUD described in JP2004-189112A has a configuration in which a heat exhaust path is provided between an air conditioning duct for taking air from the interior of a car into an air conditioning device and a light source unit, and an openable and closable shutter is provided in a connection portion between the heat exhaust path and the air conditioning duct.

When the light source unit is started up, the light source unit is cooled by opening the shutter, and the light source unit can be prevented from failing due to heat.

SUMMARY OF THE INVENTION

It is necessary to warm the light modulation element mounted on the HUD under a low temperature environment, and it is necessary to cool the light modulation element under a high temperature environment. This is because optimal driving of the light modulation element cannot be maintained unless warming or cooling is performed. It is necessary to perform heat dissipation of the light source unit of the HUD regardless of ambient temperature. This is because the light source unit fails or a light emission amount may be decreased according to a type of light source included in the light source unit and quality of a displayed image is degraded unless the heat dissipation is performed.

In the HUD described in JP2014-153578A, the light modulation element can be cooled, but the light modulation element cannot be warmed. Accordingly, a startup time of the HUD is delayed under a low temperature environment.

In the HUD described in JP1998-133177A (JP-H10-133177A), the light modulation element can be warmed, but cooling of the light modulation element is not supposed. Accordingly, the light modulation element is likely to fail under a high temperature environment.

In the HUD described in JP2004-189112A, the light source unit can be cooled, but the light modulation element cannot be cooled or warmed.

The present invention has been made in view of the above circumstances, and an object of the present invention is to provide a projection display device and a temperature control method thereof capable of easily performing cooling of a light source unit and cooling and warming of the light modulation element.

A projection display device of the present invention comprises: a light source unit; a light modulation element that modulates light that is emitted from the light source unit; a projection portion that projects the modulated light onto a projection surface; a first wind guide path that guides wind sent from an air conditioning device of a car to the light source unit; a second wind guide path that guides the wind sent from the air conditioning device to the light modulation element; a first movable member provided on the first wind guide path for performing blocking and opening of the first wind guide path; and a first movable member control unit that performs first control for controlling the first movable member to block the first wind guide path, and second control for controlling the first movable member to open the first wind guide path.

A temperature control method of a projection display device of the present invention is a temperature control method of a projection display device including a light source unit, a light modulation element that modulates light that is emitted from the light source unit, a projection portion that projects the modulated light onto a projection surface, a first wind guide path that guides wind sent from an air conditioning device of a car to the light source unit, a second wind guide path that guides the wind sent from the air conditioning device to the light modulation element, and a first movable member provided on the first wind guide path for performing blocking and opening of the first wind guide path, the temperature control method comprising: a first movable member control step of performing first control for controlling the first movable member to block the first wind guide path, and second control for controlling the first movable member to open the first wind guide path.

According to the present invention, it is possible to provide a projection display device and a temperature control method thereof capable of easily performing cooling of the light source unit and cooling and warming of the projection portion.

DESCRIPTION OF THE PREFERRED EMBODIMENTS

Hereinafter, embodiments of the present invention will be described with reference to the drawings.

Figure 1:
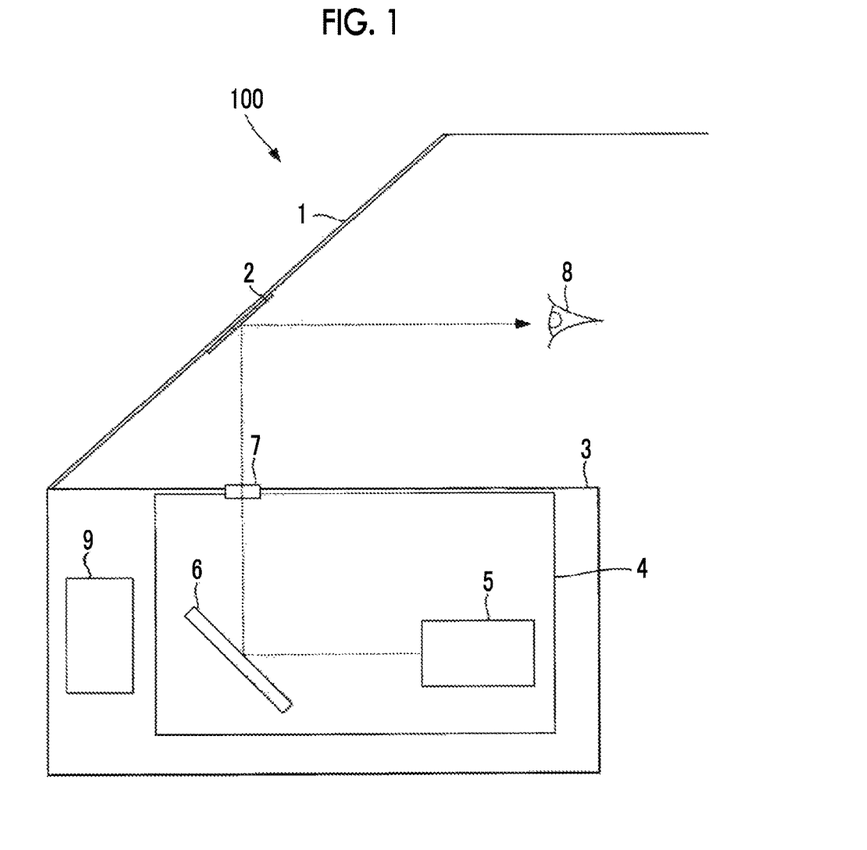
FIG. 1 is a diagram illustrating a configuration of an HUD that is an embodiment of a projection display device of the present invention.

FIG. 1 is a diagram illustrating a configuration of an HUD that is an embodiment of a projection display device of the present invention.

The HUD illustrated in FIG. 1 includes a main body unit 4 built in a dashboard 3 of a car 100, and a combiner 2 affixed to an inner surface of a windshield 1 of the car 100.

The main body unit 4 includes a display unit 5, a mirror 6 that reflects light according to image information emitted from the display unit 5, and an opening 7 for emitting the light reflected by the mirror 6 to the outside.

The combiner 2 is a projection surface on which the light projected from the opening 7 is projected, and reflects this light. A driver 8 of the car 100 can view information on driving by seeing the light reflected by the combiner 2. Further, the combiner 2 has a function of reflecting the light projected from the opening 7 and transmitting light from the outside (outside world) of the windshield 1. Therefore, the driver 8 can view a sight of the outside world outside the windshield 1 in an overlapping manner together with an image based on the light projected from the opening 7.

An air conditioning device 9 is provided inside the dashboard 3 and sends wind into the main body unit 4 and the car 100 according to a mode set via an operation unit (not illustrated) of the car 100.

The air conditioning device 9 can be set to a cooling mode and a heating mode. In a case where the air conditioning device 9 is set to the cooling mode, the air conditioning device 9 sends cold wind, and in a case where the air conditioning device 9 is set to the heating mode, the air conditioning device 9 sends warm wind.

Figure 2:
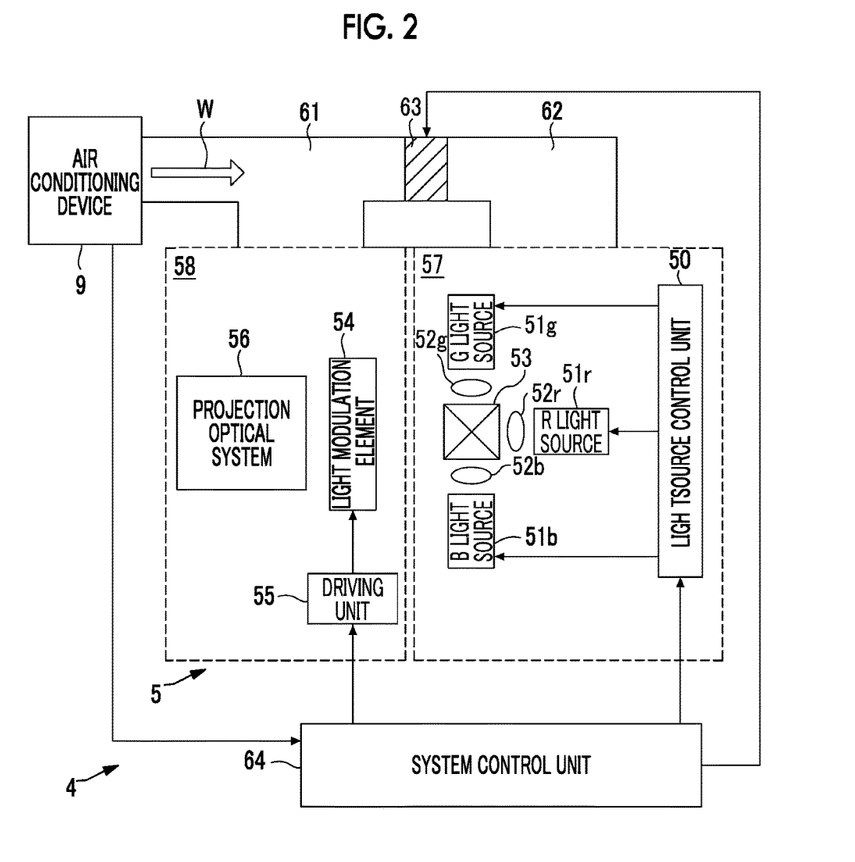
FIG. 2 is a diagram illustrating a detailed configuration of a main body unit 4 illustrated in FIG. 1.

FIG. 2 is a diagram illustrating a detailed configuration of the main body unit 4 illustrated in FIG. 1. In FIG. 2, the mirror 6 and the opening 7 are not illustrated.

The main body unit 4 includes a display unit 5 including a light source unit 57 and a projection unit 58, a wind guide path 61 that guides wind W sent from the air conditioning device 9 to the projection unit 58, a wind guide path 62 that guides the wind W sent from the air conditioning device 9 to the light source unit 57 together with the wind guide path 61, a shutter 63 provided between the wind guide path 61 and the wind guide path 62, and a system control unit 64 that generally controls all of them.

The wind guide path 61 and the wind guide path 62 constitute a first wind guide path. The wind guide path 61 constitutes a second wind guide path.

The light source unit 57 includes a light source control unit 50, an R light source 51r that is a red light source that emits red light (hereinafter referred to as R light), a G light source 51g that is a green light source that emits green light (hereinafter referred to as G light), a B light source 51b that is a blue light source that emits blue light (hereinafter referred to as B light), a dichroic prism 53, a collimator lens 52r provided between the R light source 51r and the dichroic prism 53, a collimator lens 52g provided between the G light source 51g and the dichroic prism 53, and a collimator lens 52b provided between the B light source 51b and the dichroic prism 53.

The dichroic prism 53 is an optical member for guiding light emitted from each of the R light source 51r, the G light source 51g, and the B light source 51b to the same optical path. The optical member having such a function is not limited to the dichroic prism. For example, a cross dichroic mirror may be used.

The dichroic prism 53 transmits the R light converted into parallel light by the collimator lens 52r and emits the R light to a light modulation element 54. Further, the dichroic prism 53 reflects the G light converted into parallel light by the collimator lens 52g and emits the G light to the light modulation element 54. Further, the dichroic prism 53 reflects the B light converted into parallel light by the collimator lens 52b and emits the B light to the light modulation element 54.

Light emitting elements such as a laser or a light emitting diode (LED) are used as the R light source 51r, the G light source 51g, and the B light source 51b. Although the HUD including three light sources including the R light source 51r, the G light source 51g, and the B light source 51b is exemplified in this embodiment, the number of light sources may be two, or four or more.

The light source control unit 50 performs control for setting the light emission amount of each of the R light source 51r, the G light source 51g, and the B light source 51b to a predetermined light emission amount pattern and causing light to be sequentially emitted from the R light source 51r, the G light source 51g, and the B light source 51b according to this light emission amount pattern.

The projection unit 58 includes the light modulation element 54, a driving unit 55, and a projection optical system 56.

The light modulation element 54 modulates light emitted from the light source unit 57, and emits light according to image information (red image light, blue image light, and green image light) to the projection optical system 56. The light modulation element 54 is driven by the driving unit 55.

For example, a liquid crystal on silicon (LCOS), a digital mirror device (DMD), micro electro mechanical systems (MEMS) element, a liquid crystal display element, or the like can be used as the light modulation element 54.

The projection optical system 56 is an optical system for projecting the light according to the image information emitted from the light modulation element 54 onto the mirror 6. The projection optical system 56 and the mirror 6 function as a projection portion that projects the light modulated by the light modulation element 54 onto the combiner 2 serving as a projection surface.

The shutter 63 is a first movable member provided on a first wind guide path including the wind guide path 61 and the wind guide path 62, for performing blocking and opening of the first wind guide path. The shutter 63 includes a mechanical shutter provided between the wind guide path 61 and the wind guide path 62.

"A state in which the wind guide path is blocked" refers to a state in which the wind cannot pass through the wind guide path. "A state in which the wind guide path is opened" refers to a state in which the wind can pass through the wind guide path.

The system control unit 64 controls the light source control unit 50 and the driving unit 55 and controls opening and closing of the shutter 63.

The system control unit 64 performs first control for controlling the shutter 63 to block the first wind guide path including the wind guide path 61 and the wind guide path 62, and second control for controlling the shutter 63 to open the first wind guide path including the wind guide path 61 and the wind guide path 62.

The system control unit 64 detects which of the cooling mode and the heating mode the mode of the air conditioning device 9 is, and performs either the first control or the second control according to the detected mode.

The system control unit 64 performs the second control (opening of the first wind guide path) in a state in which the system control unit 64 detects that the air conditioning device 9 is in the cooling mode, and performs the first control (blocking of the first wind guide path) in a state in which the system control unit 64 detects that the air conditioning device 9 is in the heating mode.

The system control unit 64 functions as an air conditioning mode detection unit and a first movable member control unit.

The system control unit 64 directly acquires information on the mode of the air conditioning device 9 from the air conditioning device 9. Further, the system control unit 64 estimates the mode from temperature information detected by a temperature sensor provided inside or outside the vehicle.

For example, the system control unit 64 determines that the air conditioning device 9 is in the cooling mode if outside air temperature of the car 100 or inside temperature of the car 100 is equal to or higher than a predetermined value, and determines that the air conditioning device 9 is in the heating mode if the outside air temperature of the car 100 or the inside temperature of the car 100 is lower than the predetermined value.

Figure 3:
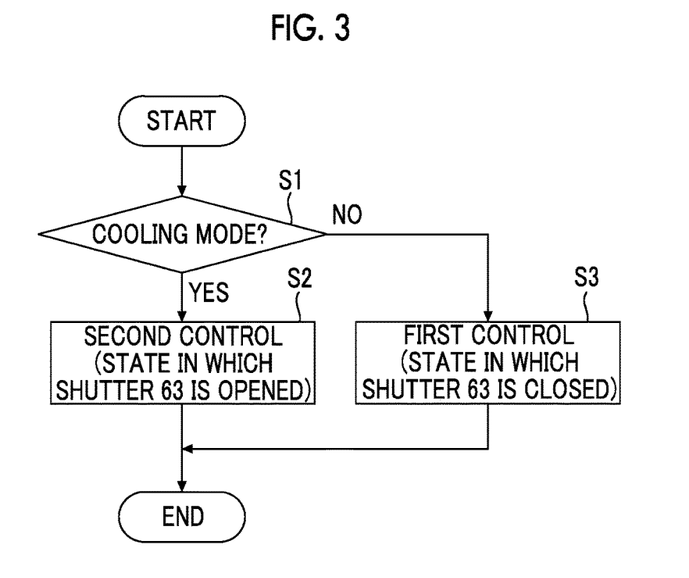
FIG. 3 is a flowchart illustrating an operation of a system control unit 64.

FIG. 3 is a flowchart illustrating an operation of the system control unit 64.

The system control unit 64 determines whether or not the mode of the air conditioning device 9 is the cooling mode (step S1). If the mode of the air conditioning device 9 is the cooling mode (step S1: YES), the system control unit 64 performs the second control (step S2).

If the second control is performed, the shutter 63 opens, and cold wind sent from the air conditioning device 9 flows to the light source unit 57 through the wind guide path 61 and the wind guide path 62. Further, the cold wind sent from the air conditioning device 9 flows to the projection unit 58 through the wind guide path 61. Therefore, the light modulation element 54 included in the projection unit 58 and each light source included in the light source unit 57 are cooled by this cold wind.

If the mode of the air conditioning device 9 is not the cooling mode but the heating mode (step S1: NO), the system control unit 64 performs the first control (step S3).

If the first control is performed, the shutter 63 is closed, and warm wind sent from the air conditioning device 9 flows to only the projection unit 58 through the wind guide path 61. That is, this hot wind is blocked by the shutter 63 and does not reach the light source unit 57. Therefore, although the light modulation element 54 included in the projection unit 58 is warmed by the hot wind, each light source included in the light source unit 57 is not warmed by this warm wind.

As described above, according to the HUD illustrated in FIG. 1, the shutter 63 is opened and both of the light source unit 57 and the projection unit 58 are cooled under a high temperature environment in which the air conditioning device 9 is set to the cooling mode. Further, under a low temperature environment in which the air conditioning device 9 is set to the heating mode, the shutter 63 is closed and only the projection unit 58 is warmed.

Therefore, under the low temperature environment, since the light modulation element 54 is warmed, a startup time of the light modulation element 54 can be made shorter. Further, the light source unit 57 is not warmed, and a light emission amount of the light source can be prevented from decreasing.

On the other hand, under the high temperature environment, since the light modulation element 54 is cooled, it is possible to prevent the light modulation element 54 from failing. Further, since the light source unit 57 is cooled, it is possible to prevent the light emission amount of the light source from decreasing.

As described above, the HUD illustrated in FIG. 1 can perform cooling and warming of the light modulation element 54 and cooling of the light source unit 57 using the warm wind and the cold wind sent from the air conditioning device 9 mounted in the car 100. Since the effects can be obtained with a simple configuration in which only the shutter 63 and the wind guide paths are provided, it is not necessary to provide a heater or a cooling mechanism dedicated to the HUD, and a cost and a size of the HUD can be reduced.

Figure 4:
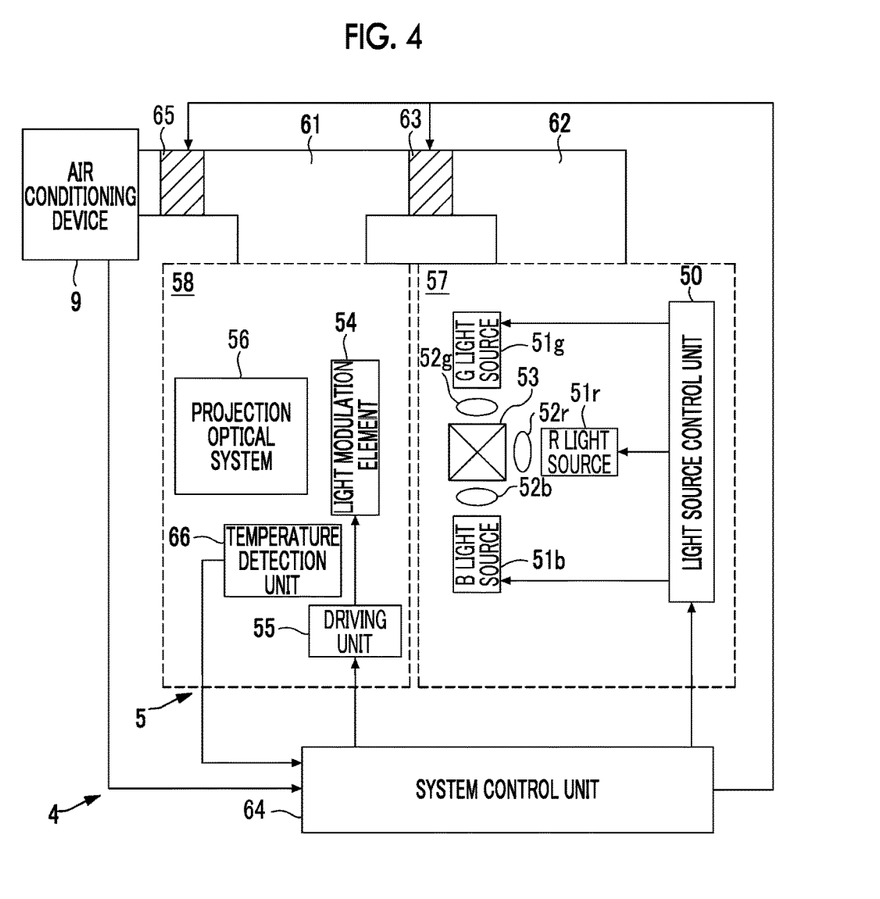
FIG. 4 is a diagram illustrating a first modification example of the main body unit 4 illustrated in FIG. 2.

FIG. 4 is a diagram illustrating a first modification example of a detailed configuration of the main body unit 4 illustrated in FIG. 1. In the main body unit 4 illustrated in FIG. 4, a shutter 65 and a temperature detection unit 66 are newly provided, and the other configuration is the same as the configuration illustrated in FIG. 2.

The shutter 65 is a second movable member for performing blocking and opening of the wind guide path 61, which is provided on a wind guide path 61. The shutter 65 is provided between the wind guide path 61 and an outlet of wind W of the air conditioning device 9.

The temperature detection unit 66 detects temperature of the light modulation element 54 in the projection unit 58 and notifies the system control unit 64 of detected temperature information. The temperature detection unit 66 includes a thermistor, a thermocouple, or the like.

The system control unit 64 selectively performs the first control and the second control described above to control the shutter 63 and control the shutter 65.

The system control unit 64 selectively performs third control for controlling the shutter 65 to block the wind guide path 61 and fourth control for controlling the shutter 65 to open the wind guide path 61. The system control unit 64 functions as a second movable member control unit.

The system control unit 64 performs the third control (blocking of the wind guide path 61) in a case where the temperature detected by the temperature detection unit 66 is equal to or higher than a threshold value in a state in which the air conditioning device 9 is in the heating mode, and performs the fourth control (opening of the wind guide path 61) in a case where the temperature detected by the temperature detection unit 66 is lower than the threshold value.

Figure 5:
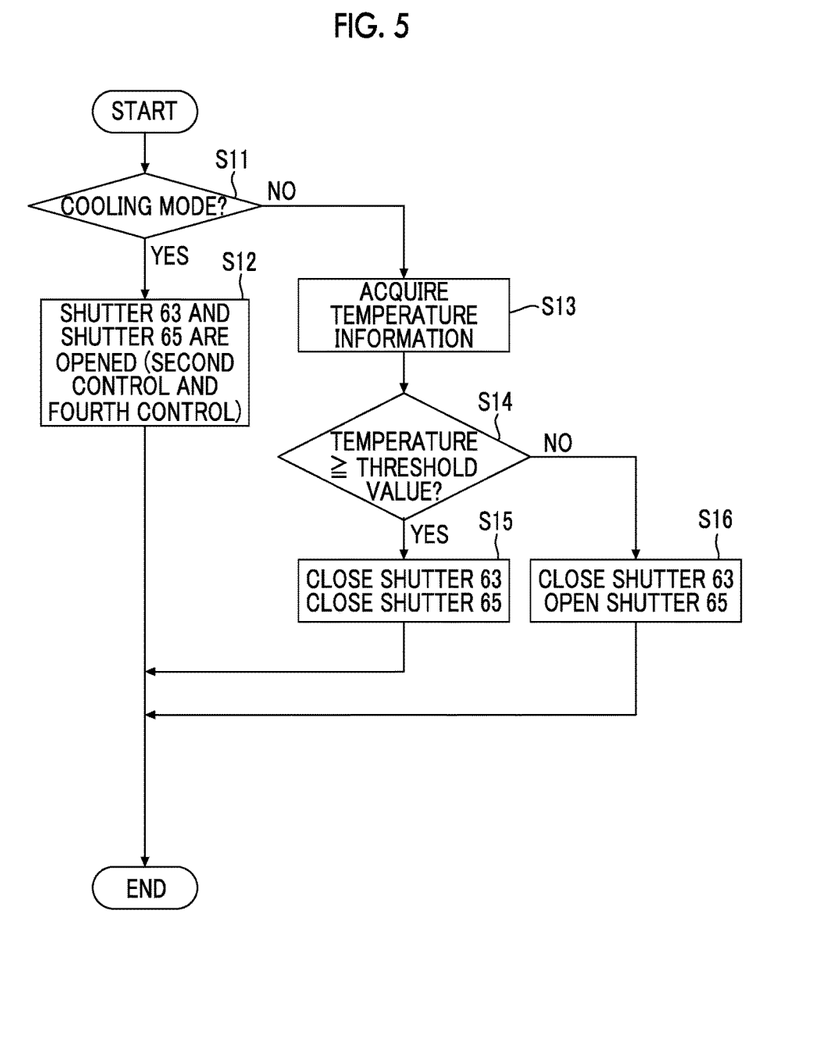
FIG. 5 is a flowchart illustrating an operation of a system control unit 64 in the modification example illustrated in FIG. 4.

FIG. 5 is a flowchart illustrating an operation of the system control unit 64 illustrated in FIG. 4.

The system control unit 64 determines whether or not the mode of the air conditioning device 9 is the cooling mode (step S11). When the system control unit 64 determines that the mode is the cooling mode (step S11: YES), the system control unit 64 performs the second control and the fourth control (step S12).

If the second control and the fourth control are performed, the shutter 63 and the shutter 65 are opened, and the cold wind sent from the air conditioning device 9 flows to the light source unit 57 through the wind guide path 61 and the wind guide path 62. The cold wind sent from the air conditioning device 9 flows to the projection unit 58 through the wind guide path 61. Therefore, the light modulation element 54 included in the projection unit 58 and each light source included in the light source unit 57 are cooled by this cold wind.

In a case where the system control unit 64 determines that the mode of the air conditioning device 9 is not the cooling mode but the heating mode (step S11: NO), the system control unit 64 acquires temperature information from the temperature detection unit 66 (step S13).

The system control unit 64 determines whether or not the acquired temperature information is equal to or higher than the threshold value (step S14). When the determination in step S14 is YES, the system control unit 64 performs the first control and the third control (step S15).

If the first control and the third control are performed, the shutter 63 and the shutter 65 are closed, the warm wind sent from the air conditioning device 9 is blocked by the shutter 65, and the warm wind does not flow to either the projection unit 58 or the light source unit 57. Therefore, the projection unit 58 and the light source unit 57 are not warmed.

When the determination in step S14 is NO, the system control unit 64 performs the first control and the second control.

If the first control and the second control are performed, the shutter 63 is closed and the shutter 65 is opened. Accordingly, the hot wind sent from the air conditioning device 9 flows to the projection unit 58 through the wind guide path 61. The light modulation element 54 is warmed by this warm wind. Since this warm wind is blocked by the shutter 63, the warm wind does not flow to the light source unit 57. Therefore, the light source unit 57 is not warmed.

Thus, in the case of the heating mode, since it can be determined that it is under a low temperature environment, the system control unit 64 opens the shutter 65 and closes the shutter 63. Accordingly, it is possible to cause the warm wind sent from the air conditioning device 9 to flow to only the projection unit 58 and not to flow to the light source unit 57.

As a result, it is possible to warm the projection unit 58 with the warm wind and make a startup time of the light modulation element 54 shorter. Further, it is possible to prevent the light source unit 57 from being warmed with the warm wind and maintain a light emission amount of the light source.

Further, in the case of the heating mode, the system control unit 64 warms the projection unit 58 with warm wind, but in a case where the light modulation element 54 is warmed to the temperature (the above threshold value) at which the light modulation element 54 can appropriately operate, the system control unit 64 closes the shutter 65 so that the warm wind sent from the air conditioning device 9 does not flow to the projection unit 58. Accordingly, it is possible to prevent the light modulation element 54 from being excessively warmed and prevent the light modulation element 54 from failing.

In the configurations illustrated in FIGS. 2 and 4, the shutter 63 is closed in the state of the heating mode. When this state continues, the warm wind continues to hit the shutter 63. Accordingly, temperature inside the wind guide path 62 is likely to rise. As a result, the light source unit 57 is likely to be warmed. Therefore, it is preferable for a heat dissipation member such as a heat dissipation fin to be attached to the shutter 63 in order to prevent the temperature rise of the shutter 63.

Further, in the configuration of FIG. 4, the shutter 63 and the shutter 65 are closed in a state of the heating mode and in a state in which the temperature detected by the temperature detection unit 66 is equal to or higher than a threshold value. If this state continues, the warm wind continues to hit the shutter 65. Accordingly, temperature inside the wind guide path 61 is likely to rise. As a result, the projection unit 58 is likely to be warmed. Therefore, it is preferable for a heat dissipation member such as a heat dissipation fin to be attached to the shutter 65 in order to prevent the temperature rise of the shutter 65.

Figure 6:
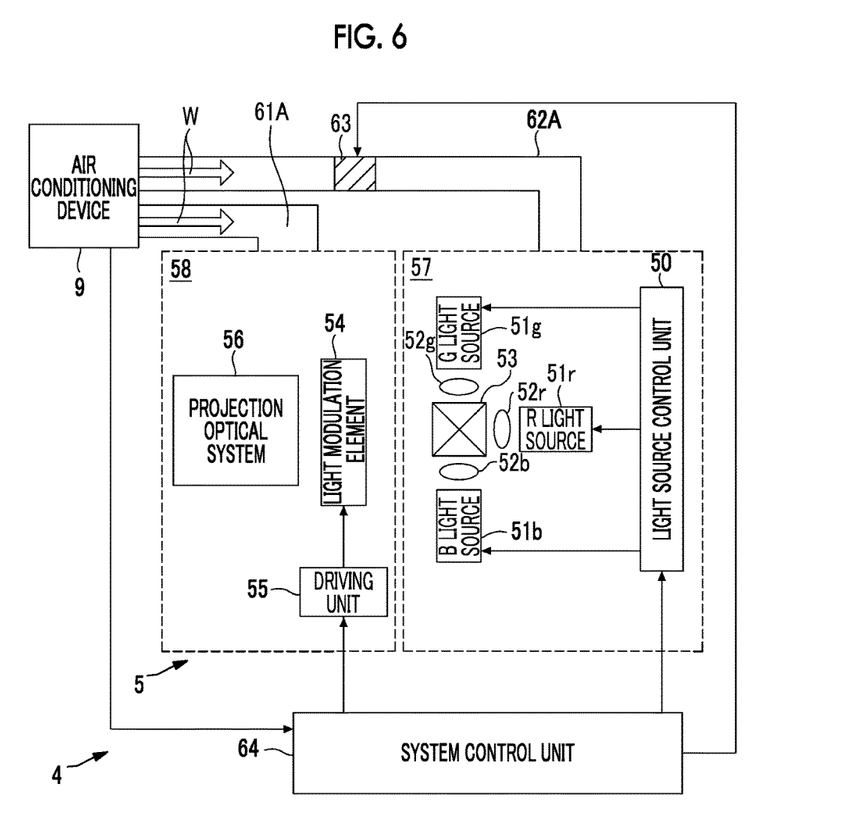
FIG. 6 is a diagram illustrating a second modification example of the main body unit 4 illustrated in FIG. 2.

FIG. 6 is a diagram illustrating a second modification example of the detailed configuration of the main body unit 4 illustrated in FIG. 1. In a main body unit 4 illustrated in FIG. 6, the wind guide path 61 is replaced with a wind guide path 61A, the wind guide path 62 is replaced with a wind guide path 62A, and a shutter 63 for performing blocking and opening of a wind guide path 62A is arranged on the wind guide path 62A, unlike the configuration in FIG. 2.

The wind guide path 61A constitutes the second wind guide path that guides the wind W sent from the air conditioning device 9 to the light modulation element 54.

The wind guide path 62A constitutes the first wind guide path that guides the wind W sent from the air conditioning device 9 to the light source unit 57.

Thus, even when the wind guide path 61A and the wind guide path 62A are individually provided, the same effects as in the configuration of FIG. 2 can be obtained. A space for wind guide paths can be reduced in the configuration of FIG. 2, unlike the configuration of FIG. 6.

It should be considered that the disclosed embodiments are illustrative and are not restrictive in all respects. The scope of the present invention is intended to be defined not by the above description but by the claims and to include all changes within meanings and a scope equivalent to the claims.

The following matters are disclosed in this specification, as described above.

The disclosed projection display device includes a light source unit, a light modulation element that modulates light that is emitted from the light source unit, a projection portion that projects the modulated light onto a projection surface, a first wind guide path that guides wind sent from an air conditioning device of a car to the light source unit, a second wind guide path that guides the wind sent from the air conditioning device to the light modulation element, a first movable member provided on the first wind guide path for performing blocking and opening of the first wind guide path, and a first movable member control unit that performs first control for controlling the first movable member to block the first wind guide path, and second control for controlling the first movable member to open the first wind guide path.

The disclosed projection display device further includes an air conditioning mode detection unit that detects which of a cooling mode and a heating mode the air conditioning device is in, wherein the first movable member control unit performs the second control in a state in which the air conditioning mode detection unit detects that the air conditioning device is in the cooling mode, and performs the first control in a state in which the air conditioning mode detection unit detects that the air conditioning device is in the heating mode.

The disclosed projection display device further includes a second movable member provided on the second wind guide path for performing blocking and opening of the second wind guide path, a temperature detection unit that detects temperature of the light modulation element, and a second movable member control unit that performs third control for controlling the second movable member to block the second wind guide path, and fourth control for controlling the second movable member to open the second wind guide path, wherein the second movable member control unit performs the third control in a case where the temperature detected by the temperature detection unit is equal to or higher than a threshold value in the state in which the air conditioning mode detection unit detects that the air conditioning device is in the heating mode, and performs the fourth control in a case where the temperature is lower than the threshold value.

In the disclosed projection display device, a heat dissipation member is attached to the second movable member.

In the disclosed projection display device, a heat dissipation member is attached to the first movable member.

A disclosed temperature control method of a projection display device is a temperature control method of a projection display device including a light source unit, a light modulation element that modulates light that is emitted from the light source unit, a projection portion that projects the modulated light onto a projection surface, a first wind guide path that guides wind sent from an air conditioning device of a car to the light source unit, a second wind guide path that guides the wind sent from the air conditioning device to the light modulation element, and a first movable member provided on the first wind guide path for performing blocking and opening of the first wind guide path, the temperature control method including a first movable member control step of performing first control for controlling the first movable member to block the first wind guide path, and second control for controlling the first movable member to open the first wind guide path.

The disclosed temperature control method of a projection display device further includes an air conditioning mode detection step of detecting which of a cooling mode and a heating mode the air conditioning device is in, wherein the first movable member control step includes performing the second control in a state in which it is detected in the air conditioning mode detection step that the air conditioning device is in the cooling mode, and performing the first control in a state in which it is detected in the air conditioning mode detection step that the air conditioning device is in the heating mode.

In the disclosed temperature control method of a projection display device, the projection display device further includes a second movable member provided on the second wind guide path for performing blocking and opening of the second wind guide path, the temperature control method further includes a temperature detection step of detecting temperature of the light modulation element, and a second movable member control step of performing third control for controlling the second movable member to block the second wind guide path, and fourth control for controlling the second movable member to open the second wind guide path, and the second movable member control step includes performing the third control in a case where the temperature detected in the temperature detection step is equal to or higher than a threshold value in the state in which it is determined in the air conditioning mode detection step that the air conditioning device is in the heating mode, and performing the fourth control in a case where the temperature is lower than the threshold value.

In the disclosed temperature control method of a projection display device, a heat dissipation member is attached to the second movable member.

In the disclosed temperature control method of a projection display device, a heat dissipation member is attached to the first movable member.

The present invention is particularly applied to a vehicle-mounted HUD, and is highly convenient and effective.

EXPLANATION OF REFERENCES

100: car
2: combiner
6: mirror
9: air conditioning device
50: light source control unit
51r: R light source
51g: G light source
51b: B light source
54: light modulation element
56: projection optical system
61, 62, 61A, 62A: wind guide path
63, 65: shutter
64: system control unit

What is claimed is:

1. A projection display device, comprising:
   a light source unit;
   a light modulation element that modulates light that is emitted from the light source unit;
   a projection portion that projects the modulated light onto a projection surface;
   a first wind guide path that guides wind sent from an air conditioning device of a car to the light source unit;
   a second wind guide path that guides the wind sent from the air conditioning device to the light modulation element;
   a first movable member provided on the first wind guide path for performing blocking and opening of the first wind guide path;
   a first movable member control unit that performs first control for controlling the first movable member to block the first wind guide path, and second control for controlling the first movable member to open the first wind guide path;
   an air conditioning mode detection unit that detects which of a cooling mode and a heating mode the air conditioning device is in;
   a second movable member provided on the second wind guide path for performing blocking and opening of the second wind guide path;
   a temperature detection unit that detects temperature of the light modulation element; and
   a second movable member control unit that performs third control for controlling the second movable member to block the second wind guide path, and fourth control for controlling the second movable member to open the second wind guide path,
   wherein the first movable member control unit performs the second control in a state in which the air conditioning mode detection unit detects that the air conditioning device is in the cooling mode, and performs the first control in a state in which the air conditioning mode detection unit detects that the air conditioning device is in the heating mode, and
   the second movable member control unit performs the third control in a case where the temperature detected by the temperature detection unit is equal to or higher than a threshold value in the state in which the air conditioning mode detection unit detects that the air conditioning device is in the heating mode, and performs the fourth control in a case where the temperature is lower than the threshold value.

2. The projection display device according to claim 1, wherein a heat dissipation member is attached to the second movable member.

3. The projection display device according to claim 1, wherein a heat dissipation member is attached to the first movable member.

4. The projection display device according to claim 2, wherein another heat dissipation member is attached to the first movable member.

5. A temperature control method of a projection display device including a light source unit, a light modulation element that modulates light that is emitted from the light source unit, a projection portion that projects the modulated light onto a projection surface, a first wind guide path that guides wind sent from an air conditioning device of a car to the light source unit, a second wind guide path that guides the wind sent from the air conditioning device to the light modulation element, a first movable member provided on the first wind guide path for performing blocking and opening of the first wind guide path, and a second movable member provided on the second wind guide path for performing blocking and opening of the second wind guide path, the temperature control method comprising:
   a first movable member control step of performing first control for controlling the first movable member to block the first wind guide path, and second control for controlling the first movable member to open the first wind guide path;
   an air conditioning mode detection step of detecting which of a cooling mode and a heating mode the air conditioning device is in;
   a temperature detection step of detecting temperature of the light modulation element; and
   a second movable member control step of performing third control for controlling the second movable member to block the second wind guide path, and fourth control for controlling the second movable member to open the second wind guide path,
   wherein the first movable member control step includes performing the second control in a state in which it is detected in the air conditioning mode detection step that the air conditioning device is in the cooling mode, and performing the first control in a state in which it is detected in the air conditioning mode detection step that the air conditioning device is in the heating mode, and
   the second movable member control step includes performing the third control in a case where the temperature detected in the temperature detection step is equal to or higher than a threshold value in the state in which it is determined in the air conditioning mode detection step that the air conditioning device is in the heating mode, and performing the fourth control in a case where the temperature is lower than the threshold value.

6. The temperature control method of a projection display device according to claim 5, wherein a heat dissipation member is attached to the second movable member.

7. The temperature control method of a projection display device according to claim 5, wherein a heat dissipation member is attached to the first movable member.

8. The temperature control method of a projection display device according to claim 6, wherein another heat dissipation member is attached to the first movable member.

* * * * *